(12) United States Patent
Mitsui

(10) Patent No.: US 10,351,398 B2
(45) Date of Patent: Jul. 16, 2019

(54) ROPE HOIST

(71) Applicant: KITO CORPORATION, Nakakoma-gun, Yamanashi (JP)

(72) Inventor: Hiroki Mitsui, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 177 days.

(21) Appl. No.: 15/316,653

(22) PCT Filed: May 14, 2015

(86) PCT No.: PCT/JP2015/063899
§ 371 (c)(1),
(2) Date: Dec. 6, 2016

(87) PCT Pub. No.: WO2015/186484
PCT Pub. Date: Dec. 10, 2015

(65) Prior Publication Data
US 2017/0152128 A1 Jun. 1, 2017

(30) Foreign Application Priority Data
Jun. 6, 2014 (JP) ................... 2014-117950

(51) Int. Cl.
*B66D 3/22* (2006.01)
*B66D 3/26* (2006.01)
(Continued)

(52) U.S. Cl.
CPC ................. *B66D 3/22* (2013.01); *B66C 1/34* (2013.01); *B66C 11/06* (2013.01); *B66D 3/26* (2013.01);
(Continued)

(58) Field of Classification Search
CPC ... B66D 1/12; B66D 3/22; B66D 3/26; B66D 2700/025; B66C 1/34; B66C 11/06; H02K 7/116
See application file for complete search history.

(56) References Cited

U.S. PATENT DOCUMENTS 2,695,086 A 11/1954 Parker
2,891,132 A 6/1959 Devonshire et al.
(Continued)

FOREIGN PATENT DOCUMENTS

CN 102725221 A 10/2012
DE 102010048946 A1 4/2012
(Continued)

OTHER PUBLICATIONS

Extended European Search Report for corresponding EP Application No. 15802711.0-1731/3153455 PCT/JP2015/063899; dated Jan. 2, 2018.
(Continued)

*Primary Examiner* — Michael R Mansen
*Assistant Examiner* — Nathaniel L Adams
(74) *Attorney, Agent, or Firm* — Cantor Colburn LLP

(57) ABSTRACT

A rope hoist includes: a rope drum around which a wire rope can be wound; a drum motor for rotating the rope drum; a reduction gear mechanism reducing the rotation of the drum motor and transmitting the rotation to the rope drum; and a control unit controlling driving of the drum motor. The reduction gear mechanism is arranged inside a wall portion provided by being projected from a motor cover of a main body part which is an end frame member supporting the rope drum, a lead wire extended from the drum motor and a cable extended from the control unit are connected via a relay, and the relay is arranged on the outside of the wall portion
(Continued)

surrounding the reduction gear mechanism, and housed inside a recess provided on the motor cover.

18 Claims, 11 Drawing Sheets

(51) Int. Cl.
    *B66C 1/34*     (2006.01)
    *B66C 11/06*     (2006.01)
    *H02K 7/116*     (2006.01)

(52) U.S. Cl.
    CPC ........ *H02K 7/116* (2013.01); *B66D 2700/025* (2013.01)

(56) References Cited

U.S. PATENT DOCUMENTS

| | | | | |
|---|---|---|---|---|
| 3,766,795 | A * | 10/1973 | Priest | B66D 1/14 192/114 R |
| 4,331,323 | A * | 5/1982 | Sekimori | B60S 11/00 242/390.8 |
| 6,966,544 | B2 * | 11/2005 | McCormick | B66B 1/32 254/342 |
| 7,274,279 | B2 * | 9/2007 | Iima | H01H 50/14 335/106 |
| 2008/0202042 | A1 * | 8/2008 | Mesrobian | B66D 1/12 52/120 |
| 2012/0256145 | A1 | 10/2012 | Zhao et al. | |
| 2012/0267592 | A1 | 10/2012 | Zhao et al. | |
| 2012/0280190 | A1 | 11/2012 | Zhao et al. | |

FOREIGN PATENT DOCUMENTS

| | | |
|---|---|---|
| JP | S5421378 U | 2/1979 |
| JP | 59223698 A | 12/1984 |
| JP | 63160995 A | 7/1988 |
| JP | 3282409 B2 | 5/2002 |
| JP | 4368980 B2 | 11/2009 |
| JP | 2011157171 A | 8/2011 |

OTHER PUBLICATIONS

International Search Report corresponding to Application No. PCT/JP2015/063899; dated Jul. 28, 2015, with English translation.
SIPO First Office Action for corresponding CN Application No. 201580029897.3; dated Feb. 23, 2018.

* cited by examiner

ROPE HOIST

CROSS REFERENCE TO RELATED APPLICATIONS

This is a U.S. national stage of application No. PCT/JP2015/063899, filed on May 14, 2015. Priority under 35 U.S.C. § 119(a) and 35 U.S.C. § 365(b) is claimed from Japanese Patent Applications No. 2014-117950 filed on Jun. 6, 2014, the disclosure of which is also incorporated herein by reference.

TECHNICAL FIELD

The present invention relates to a rope hoist which is used when performing operation of hoisting of cargo, when moving a cargo in a horizontal direction or a vertical direction, and the like.

BACKGROUND ART

In order to move a cargo in a longitudinal direction and to move the suspended cargo along a rail installed on a ceiling side, a rope hoist is generally used. As described in PTL 1, a rope hoist includes a rope drum for winding-up a wire rope, a drum motor rotating the rope drum, and a control unit. Further, drive signal transmission cables are used to connect between the drum motor and the control unit. As a connecting structure of the cables, there is one in which a relay terminal box is provided on the outside of a rope drum mechanism, for example. In this case, a cable from the drum motor and a cable from the control unit are connected in the relay terminal box.

CITATION LIST

Patent Literature

{PTL 1} JP 2011-157171 A

SUMMARY OF INVENTION

Technical Problem

The above-described structure of providing the relay terminal box on the outside of the rope drum mechanism has problems such that a size is increased since the relay terminal box is provided by being projected toward the outside from a main body, and further, a neat appearance cannot be obtained.

The present invention is made based on such problems, and an object thereof is to provide a rope hoist capable of reducing a size thereof, and having a neat appearance.

Solution to Problem

In order to solve the above-described problems, a rope hoist includes: a rope drum around which a wire rope can be wound; a drum motor for rotating the rope drum; a reduction gear mechanism reducing the rotation of the drum motor and transmitting the rotation to the rope drum; and a control unit controlling driving of the drum motor, in which the rope drum and the drum motor are attached in a parallel manner to one surface of an end frame member, the reduction gear mechanism is arranged on the other surface of the end frame member, the end frame member has a motor cover covering an end surface on the reduction gear mechanism side of the drum motor, the motor cover is provided with a recess which is dug so as to project from a surface of the motor cover toward the inside of the drum motor, at a position isolated from the reduction gear mechanism, and a connecting member connecting a lead wire extended from a stator winding of the drum motor and a cable extended from the control unit is housed in the recess.

Further, in addition to the above-described invention, it is preferable that the end frame member includes a first hole portion through which the lead wire extended from the stator winding of the drum motor is inserted into the recess, and a second hole portion through which the cable extended from the control unit is inserted into the recess.

Further, in addition to the above-described invention, it is preferable that the connecting member is a relay including a terminal block and a terminal block bracket, the terminal block is a part for connecting the lead wire extended from the stator winding of the drum motor and the cable extended from the control unit, and the terminal block bracket is a part for fixing the terminal block to the end frame member in the recess.

Further, in addition to the above-described invention, it is preferable that the connecting member includes a first crimp terminal attached to an end of the lead wire, and a second crimp terminal attached to an end of the cable, and the connecting member further includes a fastening member fastening the first crimp terminal and the second crimp terminal in a state where the first crimp terminal and the second crimp terminal are overlapped and both of the terminals can be electrically conducted with each other.

Further, in addition to the above-described invention, it is preferable that the connecting member is a sleeve into which an end of the lead wire and an end of the cable are inserted, and electrically connecting the lead wire and the cable.

Further, in addition to the above-described invention, it is preferable that the recess is sealed by a cover member via packing in a state of housing the connecting member.

Further, in addition to the above-described invention, it is preferable that the cable extended from the control unit is attached to a cable stay bridged between the end frame member and a counterweight to which the control unit is attached.

DESCRIPTION OF EMBODIMENTS

Figure 1:
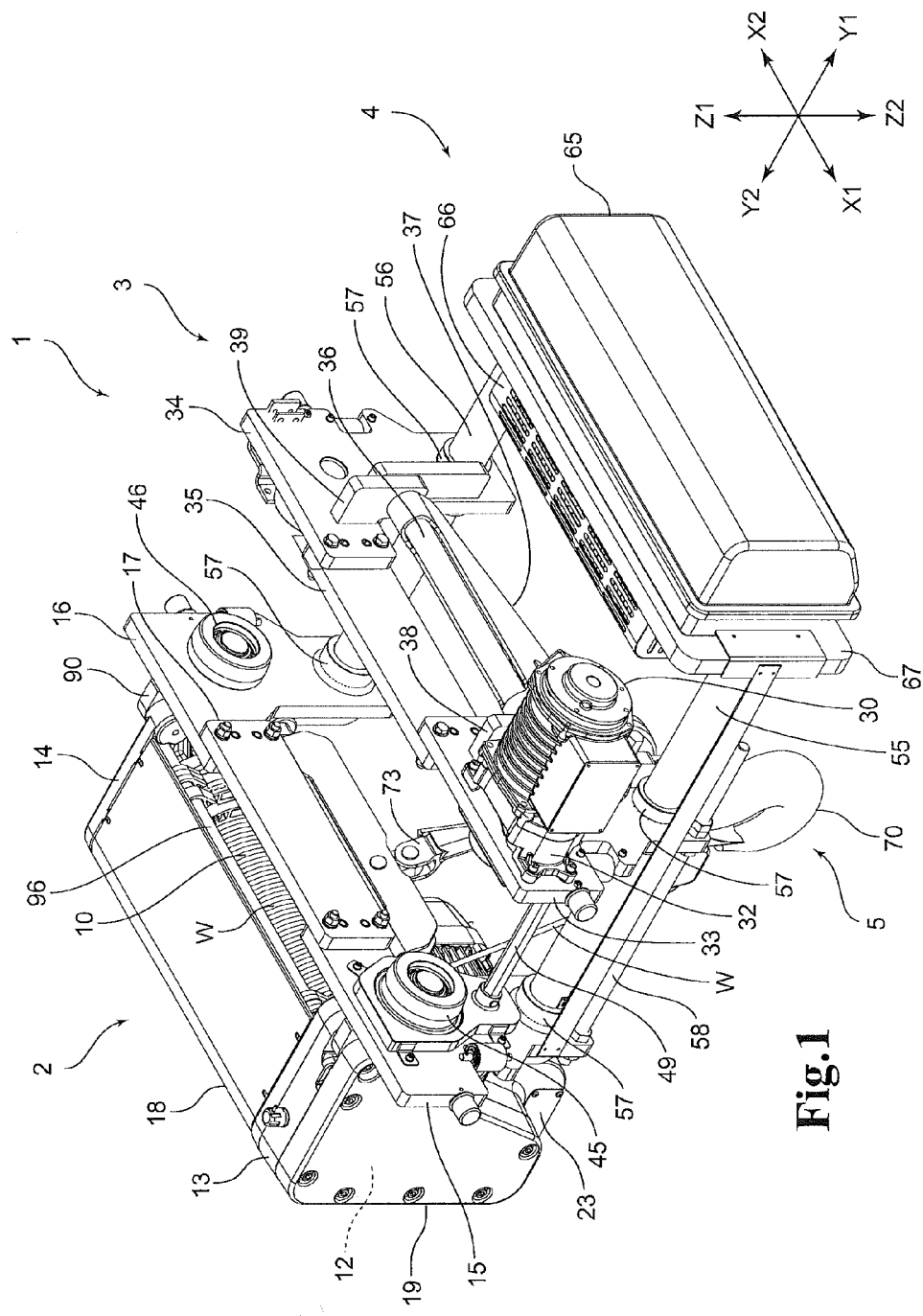
FIG. 1 is a perspective view illustrating the entire configuration of a rope hoist according to a first embodiment of the present invention.

Hereinafter, a rope hoist 1 according to a first embodiment of the present invention will be described while referring to the drawings. Note that the description will be made hereinbelow by using XYZ orthogonal coordinate system according to need. In the XYZ orthogonal coordinate system, an X direction indicates a direction in which a rail which guides movement of the rope hoist 1 extends, in which an X1 side indicates a front side in the illustration of FIG. 1, and an X2 side indicates an opposite side of the X1 side. A Y direction indicates a direction orthogonal to the X direction, in which a Y1 side indicates a right side when seen from the X1 direction, and a Y2 side indicates a direction on the opposite side of the Y1 side. A Z direction indicates a vertical direction and a direction orthogonal to both of the X direction and the Y direction, in which a Z1 side indicates an upper side in the vertical direction, and a Z2 side indicates a lower side being an opposite side of the Z1 side.

(Configuration of Rope Hoist 1)

Figure 2:
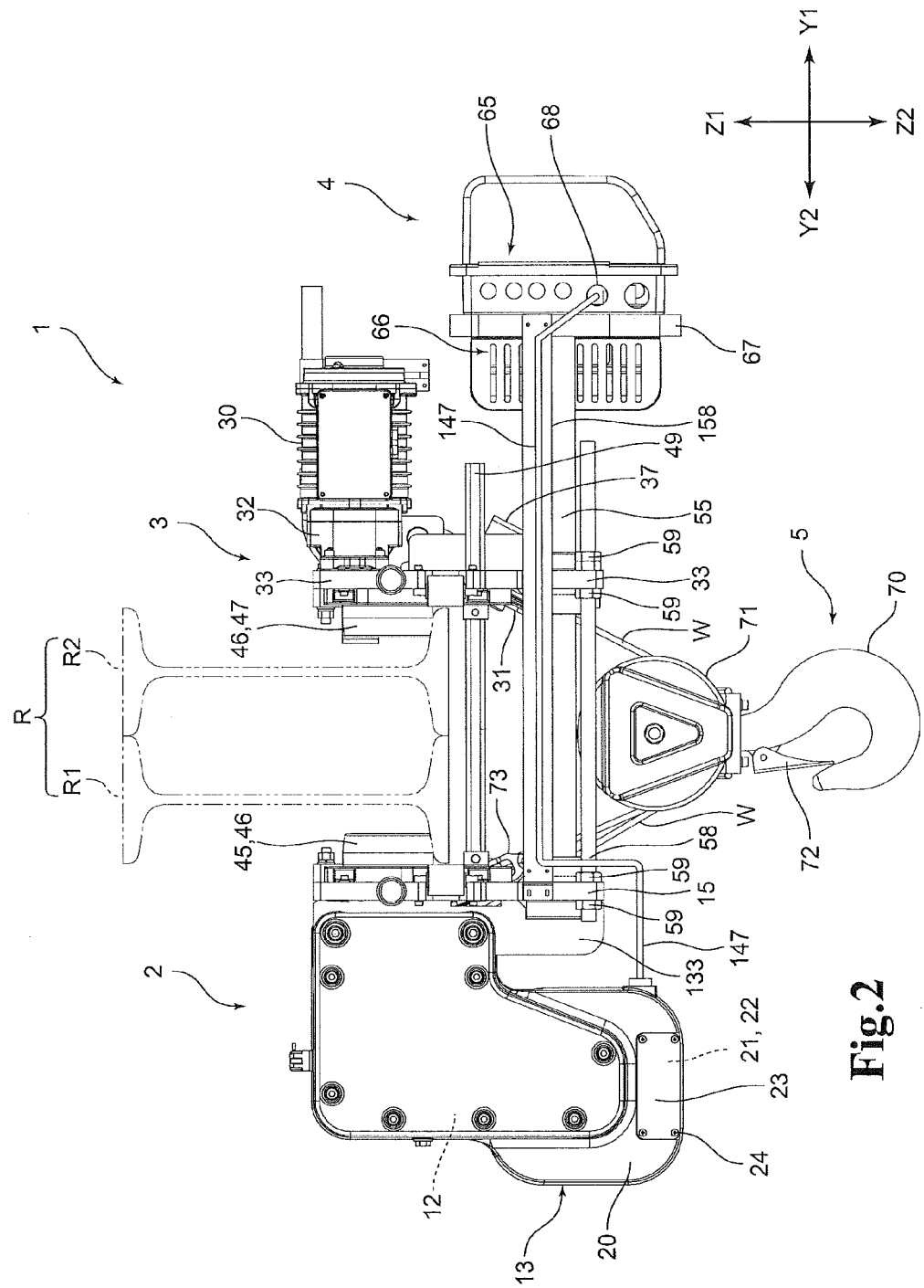
FIG. 2 is a front view illustrating the entire configuration of the rope hoist when seen from an X1 direction in FIG. 1.
Figure 3:
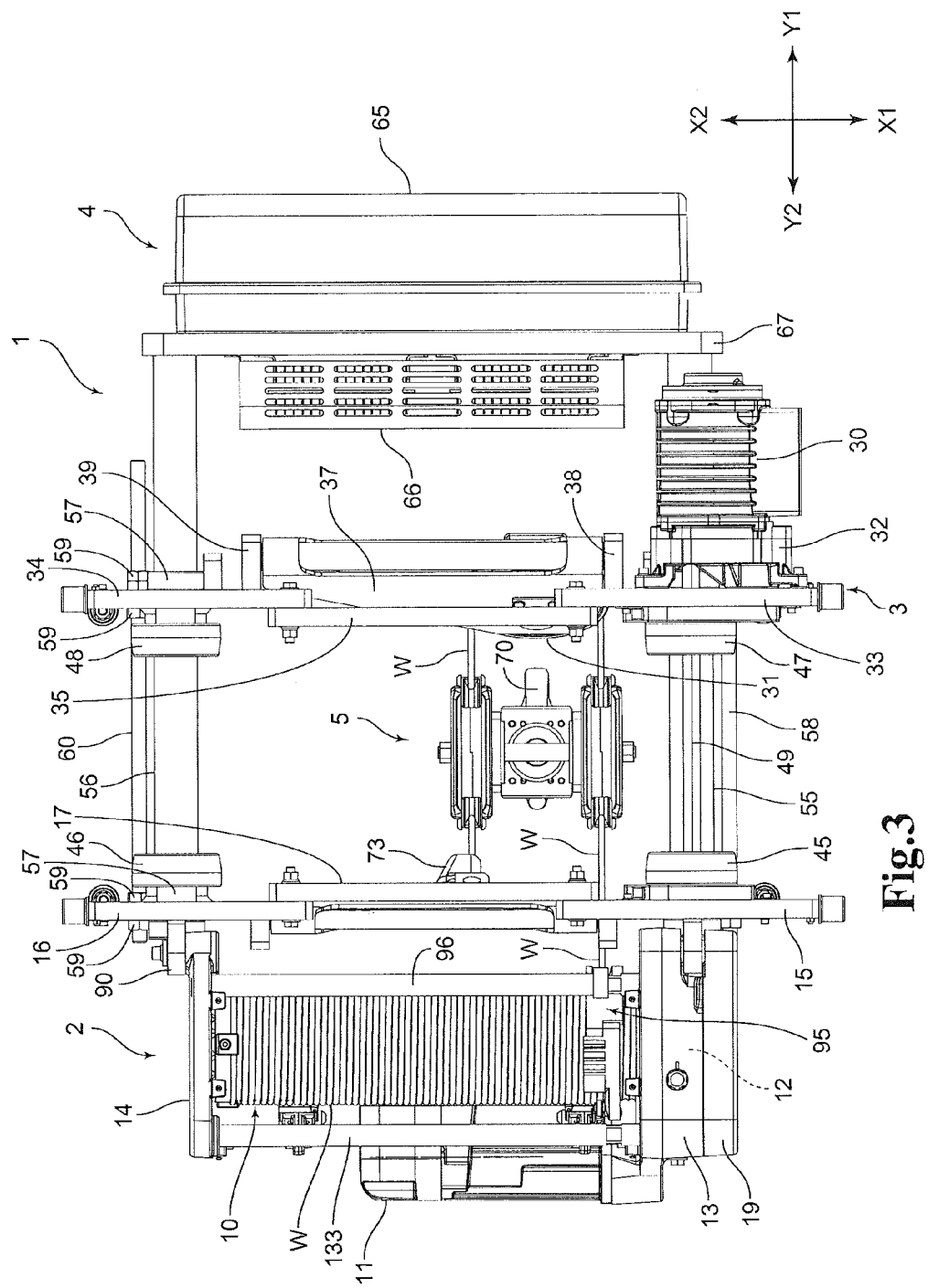
FIG. 3 is a plan view illustrating the entire configuration of the rope hoist when seen from a Z1 direction in FIG. 1.

FIG. 1 is a perspective view illustrating the entire configuration of the rope hoist 1 according to the first embodiment of the present invention. FIG. 2 is a front view illustrating the entire configuration of the rope hoist 1 when seen from the X1 direction in FIG. 1, and FIG. 3 is a plan view illustrating the entire configuration of the rope hoist 1 when seen from the Z1 direction in FIG. 1. As illustrated in FIG. 1 to FIG. 3, the rope hoist 1 is formed of a rope drum mechanism 2 arranged on the Y2 side, a trolley mechanism 3 arranged on the opposite side of the rope drum mechanism 2 while sandwiching a rail R (refer to FIG. 2), a control unit 4 arranged further on the Y1 side relative to the trolley mechanism 3, and a hook part 5 arranged on the lower side (in the Z2 direction) relative to the positions of the aforementioned components. From the control unit 4, a not-illustrated remote control switch for operation is dangled.

The rope drum mechanism 2 includes a rope drum 10, a drum motor 11 rotating the rope drum 10 (refer to FIG. 3 and FIG. 4), and a reduction gear mechanism 12 interposed between the rope drum 10 and the drum motor 11 (refer to FIG. 4 and FIG. 7), as its main components. The rope drum 10 is a drum-shaped member around which a wire rope W is wound, and on an outer peripheral side thereof, rope grooves 80 to which the wire rope W is fitted are formed (refer to FIG. 4). Details of the rope drum 10 will be described later while referring to FIG. 4.

The reduction gear mechanism 12 coupling one end portion of the rope drum 10 and the drum motor 11 is attached on a side of a main body part 13 being one end frame member, and the other end portion of the rope drum 10 is attached to a back frame 14 being the other end frame member. Further, the main body part 13 is attached to a frame 15, and the back frame 14 is attached to a frame 16. The frame 15 and the frame 16 are fixed to a beam 17 to be a beam at both end portions in the X direction of the beam 17, to be formed as an integrated frame which is parallel to the rope drum 10. An upper surface (in the Z1 direction), a side surface in the Y2 direction, and a lower surface (in the Z2 direction) of the rope drum 10 are covered with a main body cover 18, and the main body cover 18 is structured such that it is not brought into contact with the rope drum 10 and the wire rope W. Note that FIG. 3 is a view in which the main body cover 18 is omitted.

Figure 4:
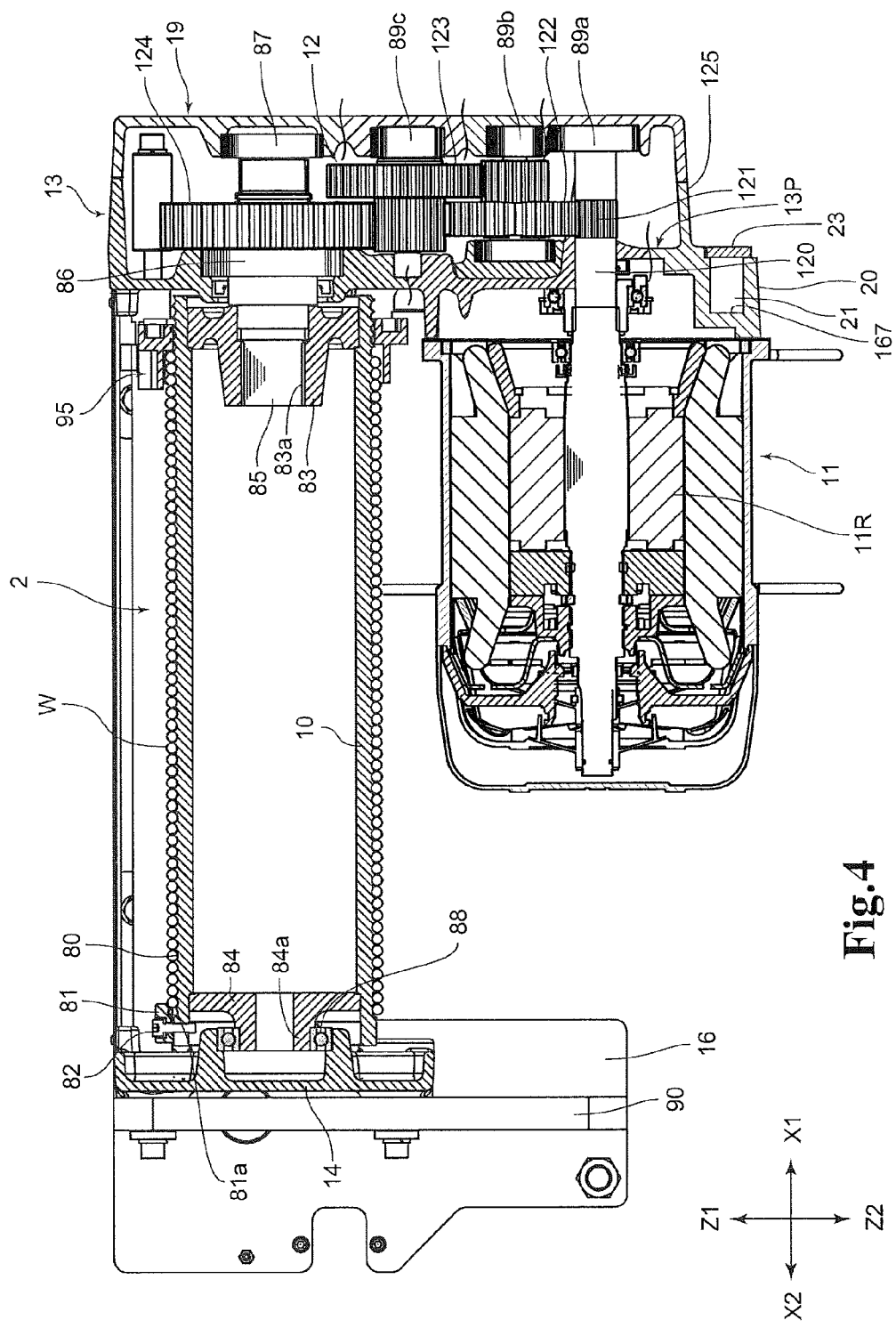
FIG. 4 is a sectional view taken along a cutting-plane line IV-IV in FIG. 5, and illustrating a rope drum mechanism and a reduction gear mechanism which are components of the rope hoist illustrated in FIG. 1.

On the side (X1 side) of the main body part 13, opposite to the side on which the rope drum 10 is arranged, the reduction gear mechanism 12 is arranged. The reduction gear mechanism 12 is housed in a space formed by the main body part 13 and a gear case 19. End portions of the rope drum 10 and the drum motor 11 are attached, in a parallel manner, to a surface in the X2 direction of the main body part 13, and the reduction gear mechanism 12 is arranged on a surface in the X1 direction of the main body part 13. As illustrated in FIG. 4, the main body part 13 has a side plate frame portion 13P facing end surfaces on the X1 side of the rope drum 10 and the drum motor 11, and on which shaft bearings of reduction gear train are arranged, and has a motor cover 20 covering an opening on an output shaft side of the drum motor 11, being a part of the side plate frame portion 13P. To the main body part 13, there is provided a recess 21 arranged at a position isolated from the reduction gear mechanism 12, and dug so as to project from a surface on the reduction gear mechanism 12 side of the motor cover 20 (a surface in the X1 direction) to the inside of the drum motor 11. A relay 22 which electrically connects a lead wire extended from a stator winding of the drum motor 11 and a lead wire of a cable extended from the control unit, is housed in the recess 21. The recess 21 is sealed by a cover member 23 in a state of housing the relay 22. As illustrated in FIG. 2, the cover member 23 is fixed to the main body part 13 by screws 24. Note that the cover member 23 is fixed to the main body part 13 via packing (not illustrated). At this time, the cover member 23 has a height which is substantially the same as that of the surface of the motor cover 20 of the main body part 13. Note that the main body part 13 has a function of supporting the rope drum 10, but, it may also be designed to indirectly support the rope drum 10. A configuration of the reduction gear mechanism 12 will be described later while referring to FIG. 4 and FIG. 5.

To a lateral side (Y1 side) of the rope drum mechanism 2, the trolley mechanism 3 arranged while sandwiching a rail R, is coupled. As illustrated in FIG. 3, the trolley mechanism 3 includes four wheels 45, 46, 47, 48 for allowing the rope hoist 1 to travel along the rail R, a traversing motor 30 driving the wheels 45, 47, out of these wheels 45, 46, 47, 48, frames 15, 16 supporting the wheels 45, 46, respectively, and frames 33, 34 supporting the wheels 47, 48, respectively. The frames 15, 16, and the frames 33, 34, are coupled by coupling shafts 55, 56. The traversing motor 30 includes a reduction gear part 32, and is fixed to the frame 33. The frame 33 is provided to face the frame 15 on the rope drum mechanism 2 side. Further, the frame 34 is provided to face the frame 16 on the rope drum mechanism 2 side. Further, the frame 33 and the frame 34 are fixed to a beam 35 to be a beam at both end portions in the X direction of the beam 35, to be formed as an integrated frame which is parallel to the rope drum 10.

The wheels 45, 46 are arranged at the same height position in the Z direction, and are arranged as being separated from each other in the X direction. Meanwhile, the wheels 47, 48 are also arranged at the same height position in the Z direction (which is also the same height position as that of the wheels 45, 46), and are arranged while being separated from each other in the X direction. Further, the wheel 45 and the wheel 47, and the wheel 46 and the wheel 48, are respectively arranged at the same position in the X direction. Note that the wheel 45 and the wheel 47 are driving wheels, one gear (not illustrated) is provided on the frame 15 side of the wheel 45, and another gear (not illustrated) is provided on the frame 33 side of the wheel 47. To both ends of a drive shaft 49 having a hexagonal cross section, there are arranged gears which engage with the wheel 45 and the wheel 47, respectively, being the driving wheels. A gear of an output shaft of the reduction gear part 32 of the traversing motor 30 drives the wheel 47 being the driving wheel, and the driving force is transmitted to the wheel 45 being the driving wheel, via the drive shaft 49. The wheels 46, 48 are driven wheels having no driving mechanism.

The coupling shafts 55, 56 can adjust an interval between the frames 15, 16, and the frames 33, 34, which face each other, in accordance with a width of the rail R. Further, the coupling shafts 55, 56 fix the frames 15, 16, and the frames 33, 34, to make the frames locate at the predetermined positions and in predetermined postures, so that the wheels 45, 46, 47, 48 are not derailed from the rail R even if a load is applied. Note that to the frames 15, 16 on the Y2 side of the trolley mechanism 3 of the coupling shafts 55, 56, the rope drum mechanism 2 is attached, and to end portions on the Y1 side of the coupling shafts 55, 56, a counterweight 67 and the control unit 4 are attached. Note that FIG. 2 exemplifies a case where the rail R illustrated in FIG. 2 is formed of a rail R1 and a rail R2. As illustrated in FIG. 1, the coupling shaft 56 is supported by the frame 16 and the frame 34 via coupling shaft bushes 57, and the coupling shaft 55 is supported by the frame 15 and the frame 33 via coupling shaft bushes 57. Note that the trolley mechanism 3 can move in the Y direction along the coupling shafts 55, 56, with respect to the rope drum mechanism 2.

A distance adjustment between the rope drum mechanism 2 and the trolley mechanism 3 is conducted by adjust bolts 58, 60. As illustrated in FIG. 2 and FIG. 3, the adjust bolt 58 is inserted into through holes provided on the frame 15 and the frame 33, nuts 59 are fastened from both sides in the Y direction of the frame 15 to fix the adjust bolt 58 on the rope drum mechanism 2 side, and nuts 59 are fastened from both sides in the Y direction of the frame 33 to fix the adjust bolt 58 on the frame 33 side. Also on the coupling shaft 56 side, similar to the coupling shaft 55, the adjust bolt 60 is inserted into through holes provided on the frame 16 and the frame 34, nuts 59 are fastened from both sides in the Y direction of the frame 16 to fix the adjust bolt 60 by defining the position of the adjust bolt 60 on the rope drum mechanism 2 side, and nuts 59 are fastened from both sides in the Y direction of the frame 34 to fix the adjust bolt 60 by defining the position of the adjust bolt 60 on the frame 33 side. It is designed such that by loosening the nuts 59, the distance between the frames 15, 16 on the rope drum mechanism 2 side, and the frames 33, 34 on the control unit 4 side, can be easily adjusted. Note that it is preferable that either of or both of the rope drum mechanism 2 side and the control unit 4 side employ a double nut structure, from a viewpoint of prevention of loosening of the nuts 59.

As illustrated in FIG. 1 to FIG. 3, the control unit 4 is arranged on end portions in the Y1 direction of the coupling shafts 55, 56. The control unit 4 has a control circuit part 65 which performs inverter control on the drum motor 11, and a braking resistor part 66 which gives braking resistance in the inverter control. Further, to the end portions in the Y1 direction of the coupling shafts 55, 56, the counterweight 67 is attached, and the control circuit part 65 is housed in an electric equipment box and attached to a surface in the Y1 direction of the counterweight 67. Meanwhile, a resistor which forms a part of the braking resistor part 66 is attached to a surface in the Y2 direction of the counterweight 67, and protected by a resistor cover. The counterweight 67 is provided to achieve a balance between weight in the Y1 direction and weight in the Y2 direction when the rope hoist 1 is suspended to the rail R.

As illustrated in FIG. 2, the hook part 5 is suspended by the wire rope W at the lower side (in the Z2 direction) relative to the positions of the respective mechanisms (the rope drum mechanism 2, the trolley mechanism 3, and the control unit 4). The hook part 5 is mainly formed of a hook 70, a hook sheave 71, and a lever 72. The lever 72 is provided to prevent a cargo suspension rope or the like from coming off the hook 70 when the cargo is suspended from the hook 70. As illustrated in FIG. 1 to FIG. 3, in the rope hoist 1 in the present embodiment, one end of the wire rope W is fixed to the rope drum 10 by a rope pressing metal fitting 81, the wire rope W is wound around the rope drum 10 along a rope groove 80 (refer to FIG. 4) from the metal fitting, and an end of the wire rope W dangled from the rope drum 10 is fixed to a rope fixing metal fitting 73. An intermediate sheave 31 is arranged between the wire rope W dangled from the rope drum 10 and a fixing part formed of the rope fixing metal fitting 73, and the hook sheave 71 is suspended by both of the wire rope W positioned between a portion at which the wire rope W is dangled from the rope drum 10 and the intermediate sheave 31, and the wire rope W positioned between the rope fixing metal fitting 73 and the intermediate sheave 31. Such a configuration corresponds to one of four-fall type (so-called 4/1 reeving type) in which one wire rope is used to suspend the hook part 5 with four wire ropes. The intermediate sheave 31 is attached to a sheave hanger 37 supported by an intermediate sheave support shaft 36, and can rotate in an orthogonal direction with respect to the intermediate sheave support shaft 36. Note that the intermediate sheave support shaft 36 is axially fixed between a frame 38 which is fixed to be orthogonal to the frame 33 and a frame 39 which is fixed to be orthogonal to the frame 34. Next, a configuration of the rope drum 10 will be described while referring to FIG. 4.

Figure 5:
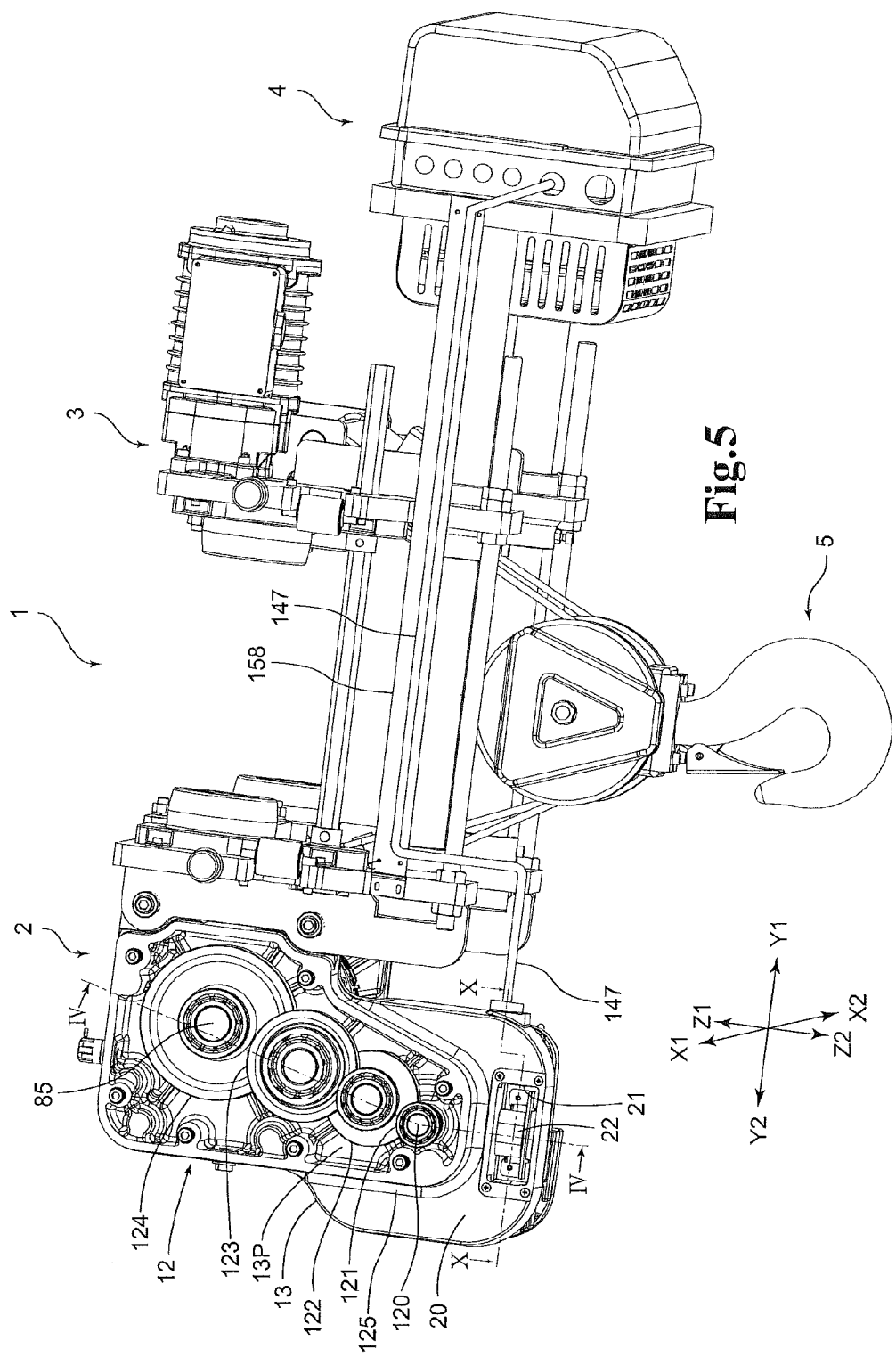
FIG. 5 is a perspective view illustrating a configuration of a periphery of the reduction gear mechanism and a relay which are components of the rope hoist illustrated in FIG. 1.

FIG. 4 is a sectional view taken along a cutting-plane line IV-IV in FIG. 5, and illustrating the rope drum mechanism 2 and the reduction gear mechanism 12 which are the components of the rope hoist 1 illustrated in FIG. 1. As illustrated in FIG. 4, the rope drum 10 is a drum-shaped member around which the wire rope W is wound, and on an outer peripheral side thereof, there are formed the rope grooves 80 with which the wire rope W is wound around the rope drum 10 in an aligned manner. A depth of the rope groove 80 is set in accordance with a radius of the wire rope W. Further, the rope grooves 80 are formed to allow the wire rope W to wind in an aligned manner in a state where the wire rope W is not overlapped (in a single-wind state). To the outer periphery of the rope drum 10, a rope guide mechanism 95 is attached. The rope guide mechanism 95 always moves to a winding end position which moves in accordance with a winding amount of the wire rope W (a rotation amount of the rope drum 10). FIG. 4 illustrates a state where the rope guide mechanism 95 is moved to the vicinity of the end portion in the X1 direction of the rope drum 10.

Note that to the end portion on the X2 side of the rope drum 10, the rope pressing metal fitting 81 for fixing the one end side of the wire rope W is attached. The rope pressing metal fitting 81 includes a recess 81a at which the wire rope W is positioned, and in a state where the wire rope W is positioned at the recess 81a, a screw 82 being a fastening means is firmly screwed in the rope drum 10. Consequently, the one end side of the wire rope W is fixed to the rope drum 10.

Further, to the end portion on the X1 side and the end portion on the X2 side of the rope drum 10, rotatable support parts 83, 84 are attached, respectively. As illustrated in FIG. 4, on the rotatable support part 83 on the X1 side, there is provided a rotation shaft hole 83a to which a drum rotation shaft 85 is coupled by spline coupling, for example. The drum rotation shaft 85 is attached to the main body part 13 and the gear case 19 via bearings 86, 87 as shaft bearings. Further, to an annular projecting portion 84a at a center portion in a radial direction of the rotatable support part 84 on the X2 side, a bearing 88 is attached, and an outer peripheral side of the bearing 88 is attached to the back frame 14. The back frame 14 is attached to the frame 16 via a joint plate 90 (refer to FIG. 3). Consequently, the rope drum 10 is rotatably supported by the main body part 13 and the back frame 14.

Subsequently, the configuration of the reduction gear mechanism 12 will be described while referring to FIG. 4. The reduction gear mechanism 12 includes: a pinion gear 121 attached to an output shaft 120 of the drum motor 11, the output shaft 120 penetrating from the rear side (the X2 direction) to the front side (the X1 direction) of the main body part 13; a gear 122 which engages with the pinion gear 121; a gear 123 which engages with the gear 122; and a gear 124 which engages with the gear 123. A rotation shaft of the gear 124 corresponds to the drum rotation shaft 85, and is fitted to the rotation shaft hole 83a with the spline structure. The output shaft 120 is rotatably supported by a bearing 89a, the gear 122 is rotatably supported by a bearing 89b, and the gear 123 is rotatably supported by a bearing 89c. The drum rotation shaft 85 (the gear 124) is rotatably supported by the bearings 86, 87 which are provided to the main body part 13 and the gear case 19, respectively. Note that a gear train formed of the pinion gear 121 and the gears 122, 123, 124, corresponds to a reduction gear train. As illustrated in FIG. 4, the recess 21 is provided at a position, isolated from the reduction gear mechanism 12, of the motor cover 20. The recess 21 is sealed by the cover member 23. The relay 22 is housed in the recess 21. The arrangement and the structure of the relay 22 will be described while referring to FIG. 5 to FIG. 9.

Subsequently, the configuration of the periphery of the reduction gear mechanism 12 and the relay 22 of the rope drum mechanism 2 will be described while referring to FIG. 5 and the like.

FIG. 5 is a perspective view illustrating the configuration of the periphery of the reduction gear mechanism 12 and the relay 22 which are the components of the rope hoist 1 illustrated in FIG. 1. Note that FIG. 5 illustrates a state where the gear case 19 and the cover member 23 are removed. The reduction gear mechanism 12 includes: the pinion gear 121 attached to the output shaft 120 of the drum motor 11, the output shaft 120 penetrating from the rear side (the X2 direction: the direction in which the drum motor 11 is arranged) to the front side (the X1 direction, the opposite side of the drum motor 11) of the main body part 13; the gear 122 which engages with the pinion gear 121; the gear 123 which engages with the gear 122; and the gear 124 which engages with the gear 123. The rotation shaft of the gear 124 corresponds to the drum rotation shaft 85 (refer to FIG. 4). The pinion gear 121, the gear 122, the gear 123, and the gear 124 are arranged substantially linearly.

As illustrated in FIG. 4 and FIG. 5, on the X1 side of the main body part 13, there is formed a wall portion 125 which is formed in a projected manner from the side plate frame portion 13P so as to surround the reduction gear train, and the gear case 19 functions as a cover member to seal an opening. A planar shape of the gear case 19 is substantially the same as a planar shape of the wall portion 125. The motor cover 20 is provided in an extended manner on the outside of the wall portion 125 (the gear case 19), and the recess 21 is provided at the position, isolated from the reduction gear mechanism 12, of the motor cover 20. The relay 22 is arranged in the recess 21. Next, a configuration of the main body part 13 will be described.

Figure 6:
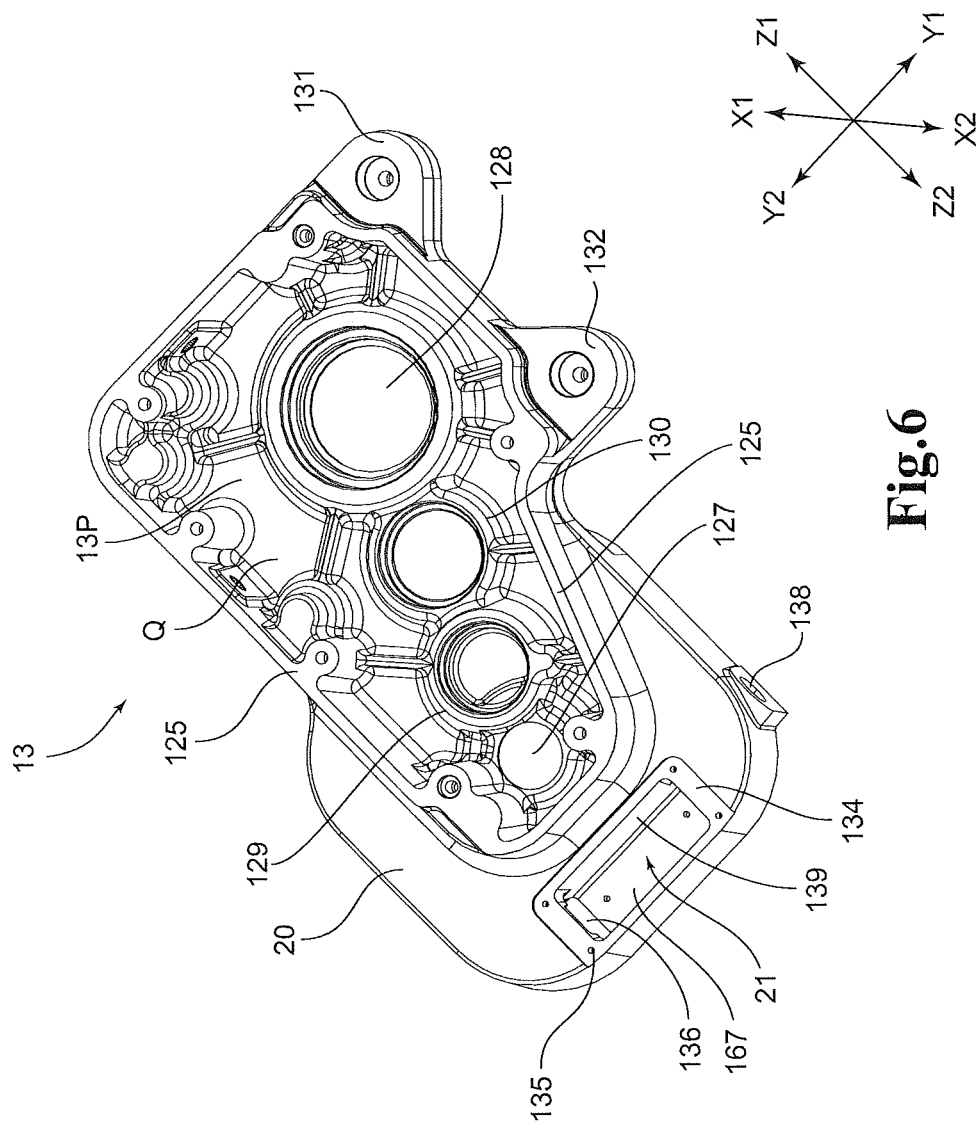
FIG. 6 is a perspective view illustrating a front side of a main body part which is a component of the rope hoist illustrated in FIG. 1.
Figure 7:
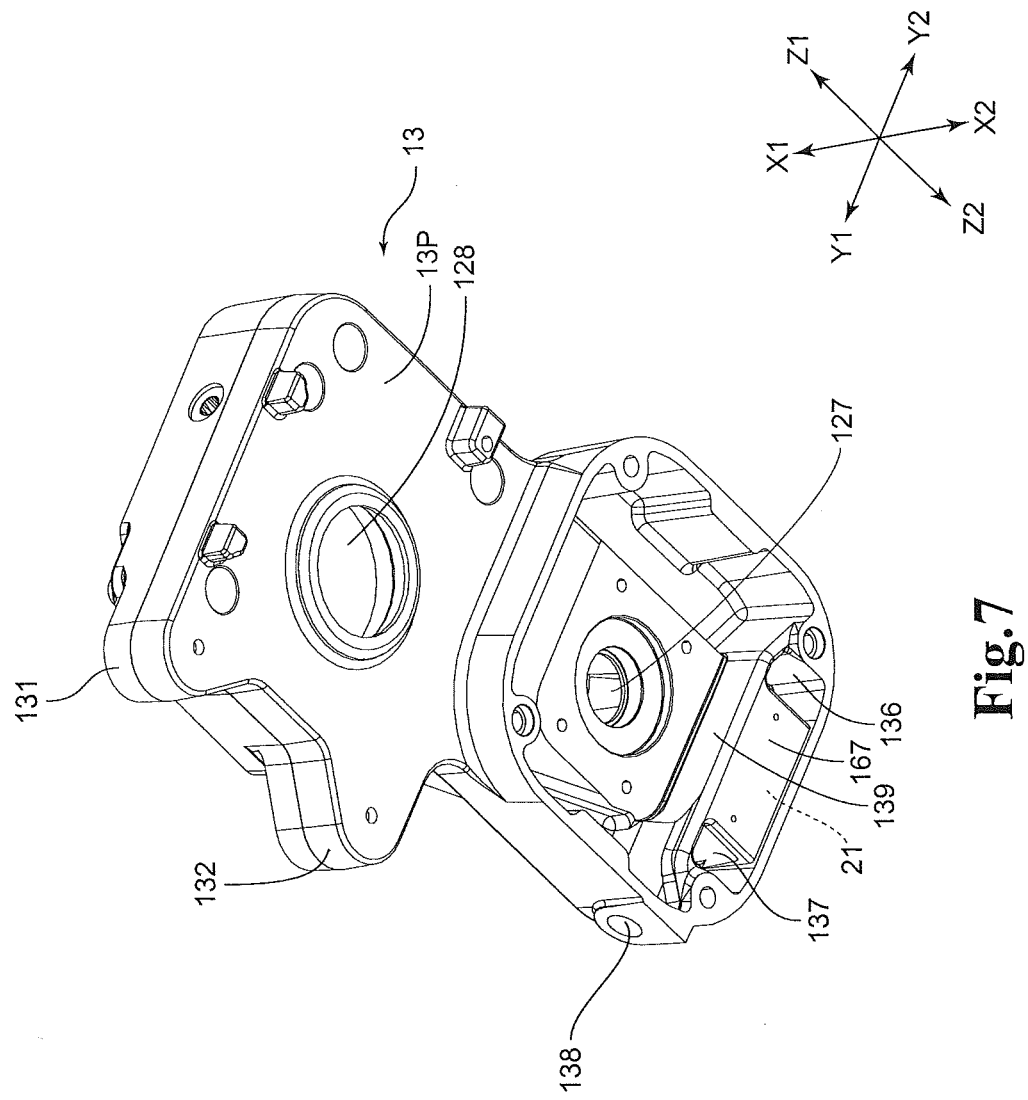
FIG. 7 is a perspective view illustrating a rear side of the main body part which is the component of the rope hoist illustrated in FIG. 1.

FIG. 6 is a perspective view illustrating the front side of the main body part 13, and FIG. 7 is a perspective view illustrating the rear side of the main body part 13. The main body part 13 of the present embodiment is a frame formed of a casting. Note that in FIG. 6 and FIG. 7, the X1 side and the X2 side of the main body part 13 are set to the front side and the rear side, respectively. As illustrated in FIG. 6, the main body part 13 includes the wall portion 125 which is formed in a projected manner to the front side from the side plate frame 13P, and the reduction gear train is arranged in a region Q surrounded by the wall portion 125 (refer to FIG. 4 and FIG. 5). Note that in the region Q, through holes 127, 128 penetrating through the front side and the rear side are provided, the through hole 127 is a hole through which the output shaft 120 of the drum motor 11 is inserted, and the through hole 128 is a hole through which the drum rotation shaft 85 is inserted. In the region Q of the side plate frame 13P, annular projecting portions 129, 130 are provided between the through hole 127 and the through hole 128, as illustrated in FIG. 6. The gear 122 is arranged in the annular projecting portion 129, and the gear 123 is arranged in the annular projecting portion 130 (refer to FIG. 4).

On an outer periphery in the Z1-Y1 direction of the main body part 13, there are formed peninsular protrusions 131, 132 located at two places and provided by being extended from the side plate frame portion 13P, and the main body part 13 is fixed to a joint plate 133 (refer to FIG. 2) at the position of the protrusions 131, 132, and fixed to the frame 15 via the joint plate 133.

As illustrated in FIG. 6, on the outside (the Z2 side) of the wall portion 125 of the motor cover 20 provided by being extended from the side plate frame portion 13P of the main body part 13, there is provided the recess 21 dug into the rear surface side from the front surface of the motor cover 20. A bottom portion 167 of the recess 21 projects toward the inside of the drum motor 11, a periphery of the recess 21 corresponds to a receiving surface 134 for the cover member 23, and its height from the front surface of the motor cover 20 is reduced by a thickness of the cover member 23 and the packing (not illustrated). At four corners of the receiving surface 134, screw holes 135 for fixing the cover member 23 are provided. A periphery of the recess 21 is surrounded by a sidewall portion 139, and at a position (the Y2 side) close to a take-out port for a lead wire 143 being a take-out wire of the stator winding of the drum motor 11, a first hole portion 136 into which the lead wire 143 (refer to FIG. 8) is inserted, is opened. On the inside of the drum motor of the first hole portion 136, the sidewall portion 139 is provided in an extended manner, thereby preventing contact between lead wires 140, 141, 142 (refer to FIG. 8), and a rotor of the drum motor 11. On a side surface in the Z2-Y1 direction of the main body part 13, a horizontal hole 138 as a second hole portion which is communicated with the recess 21, is opened. The horizontal hole 138 is an introduction guide hole which introduces a cable for motor power extended from the control unit 4 to the relay 22 into the inside of the recess 21.

As illustrated in FIG. 7, the through hole 127 into which the output shaft 120 of the drum motor 11 is inserted, is provided on the main body part 13, and at the position of the through hole 127, the drum motor 11 is arranged. The sidewall portion 139 provided so as to surround the recess 21 becomes a partition wall which isolates the drum motor 11 and the reduction gear train from the recess 21. Further, since the lead wires extended from the stator of the drum motor 11 to the recess 21, and the rotor which rotates in the drum motor 11 are isolated, the lead wires are prevented from being brought into contact with the rotor.

(Lead wire Connecting Structure)

Figure 8:
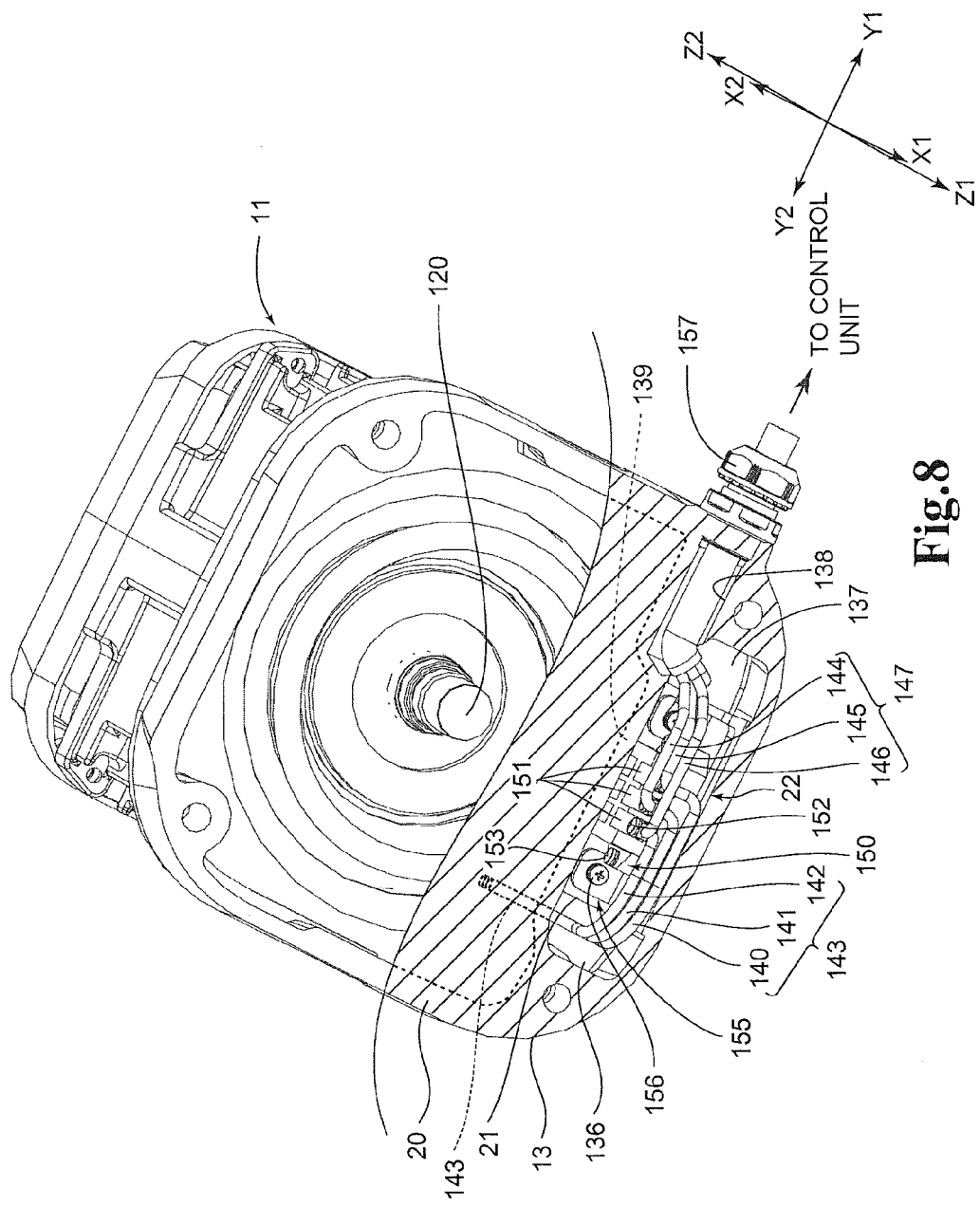
FIG. 8 is a perspective view when seeing, from above in the X1 direction, a connecting structure of lead wires connected by the relay which is the component of the rope hoist illustrated in FIG. 5.

FIG. 8 is a perspective view when a connecting structure of lead wires connected by the relay 22 illustrated in FIG. 5 is seen from the X1 direction. FIG. 8 is a view in which a part in the vicinity of the relay 22 is illustrated in a transparent manner, in order to explain the connecting structure of the lead wires. The lead wires 140, 141, 142 extended from the stator winding of the drum motor 11 pass through the first hole portion 136 to be introduced into the recess 21. The drum motor 11 of the present embodiment is a three-phase AC motor, and from the stator winding of the drum motor 11, the three lead wires 140, 141, 142 are taken out. Note that in the description hereinbelow, the lead wires 140, 141, 142 are collectively referred to as the lead wire 143.

Meanwhile, lead wires 144, 145, 146 extended from the control unit 4 pass through a cable holder 157, the horizontal hole 138, and a hole portion 137, to be introduced into the recess 21. The hole portion 137 is a horizontal hole communication portion through which the horizontal hole 138 and the recess 21 are communicated with each other. Note that it is also possible to employ a structure in which the horizontal hole 138 and the recess 21 are directly communicated with each other. Note that in the description hereinbelow, the lead wires 144, 145, 146 are collectively referred to as a cable 147. To an end portion of each of the lead wire 143 and the cable 147, a connecting terminal 148 (refer to FIG. 10) is attached.

The lead wire 143 and the cable 147 are connected by the relay 22 which corresponds to the connecting member. The relay 22 includes a terminal block 150 for connecting the lead wire 143 extended from the stator winding of the drum motor 11 and the cable 147 extended from the control unit 4, and a terminal block bracket 155 fixing the terminal block 150 to the main body part 13. One connecting terminal 148 (refer to FIG. 10) is attached to each of the lead wire 143 and the cable 147, and the lead wire and the cable each provided with the connecting terminal are introduced into a groove part 151 provided to the terminal block 150. Further, the connecting terminals 148 are overlapped in a manner that the lead wire 140 and the lead wire 145 are combined, the lead wire 141 and the lead wire 144 are combined, and the lead wire 142 and the lead wire 146 are combined, and the terminals are fixed to the terminal block 150 by screws 152 within the groove 151. Consequently, the respective lead wires are connected in the above-described respective combinations. As illustrated in FIG. 2, the cable 147 is fixed to a cable stay 158 by a not-illustrated attachment metal fitting, the cable 147 is extended toward the control unit 4 along the cable stay 158, and passes through a hole 68 opened in the electric equipment box to be connected at a predetermined connecting terminal position of the control circuit part 65 in the control unit 4. The cable stay 158 is fixed and bridged between the frame 15 and the counterweight 67.

As illustrated in FIG. 8, the terminal block 150 is fixed to the terminal block bracket 155 by screws 153, and the terminal block bracket 155 is attached to the main body part 13 by screws 156. This configuration will be described while referring to FIG. 9.

Figure 9:
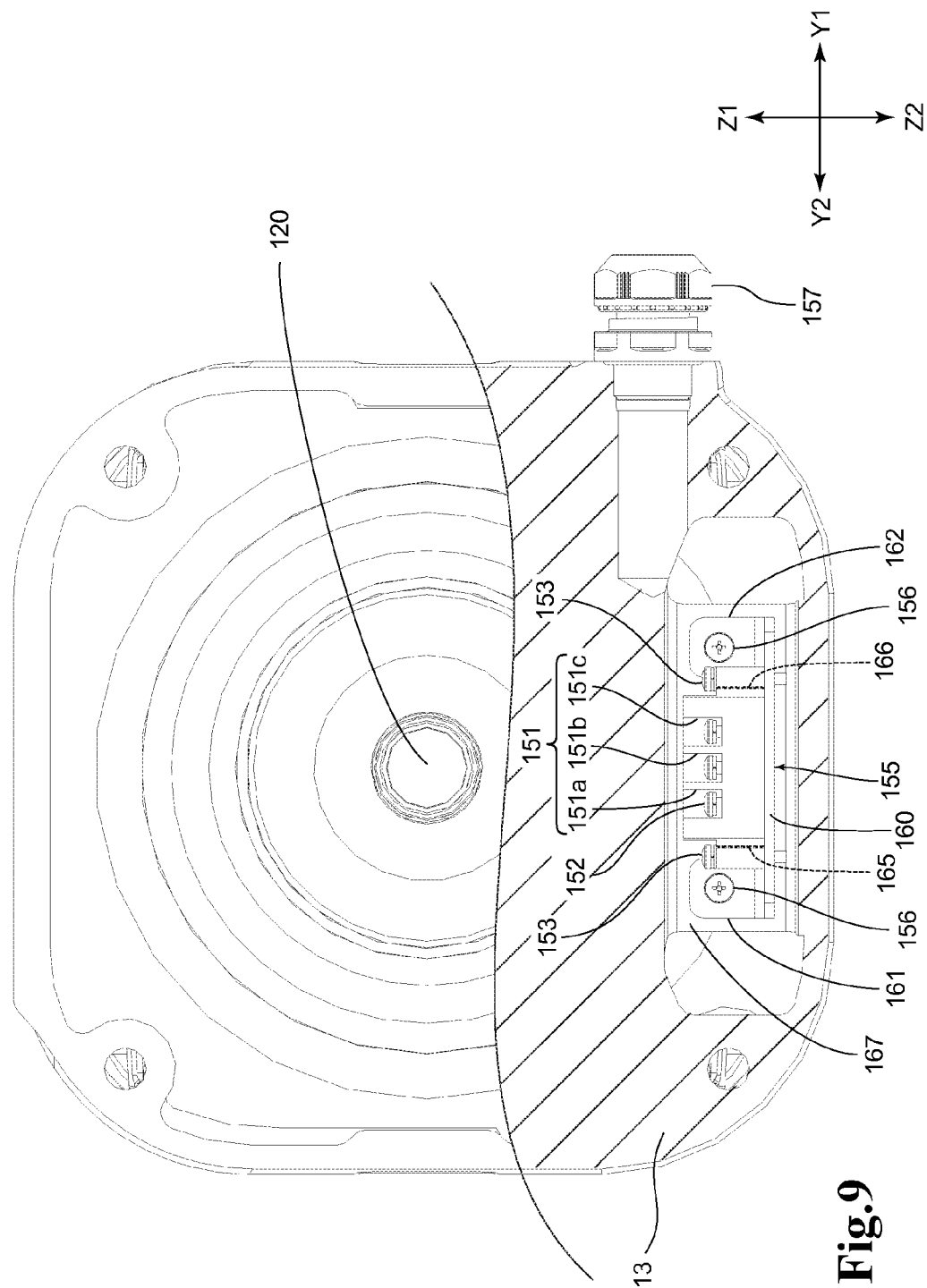
FIG. 9 is a front view illustrating a structure of attaching a terminal block and a terminal block bracket which are components of a relay 22 illustrated in FIG. 8 to the main body part.
Figure 10:
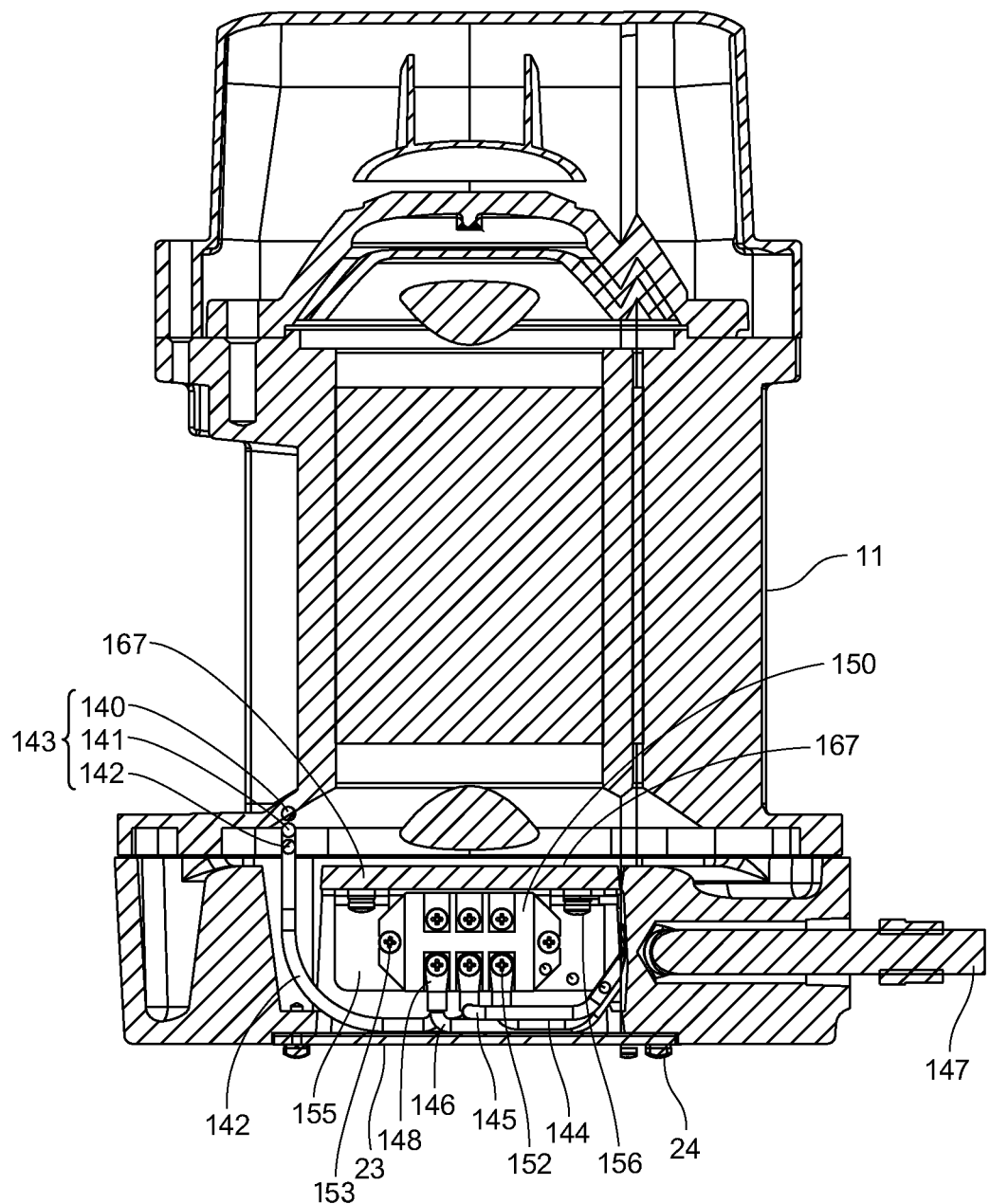
FIG. 10 is a sectional view taken along a cutting-plane line X-X in FIG. 5, and illustrating a connecting structure of lead wires.

FIG. 9 is a front view illustrating a structure of attaching the terminal block 150 and the terminal block bracket 155 of the relay 22 illustrated in FIG. 8 to the main body part 13. FIG. 10 is a sectional view taken along a cutting-plane line X-X in FIG. 5, and illustrating the connecting structure of the lead wire 143 and the cable 147. As illustrated in FIG. 9 and FIG. 10, the terminal block bracket 155 has a base 160 having fixing end portions 161, 162 provided at its both ends in the Y direction. The fixing end portions 161, 162 are bent to be orthogonal to the base 160, and have a structure capable of being fixed to the bottom portion 167 of the recess of the main body part 13 by the screws 156.

On the terminal block 150, there is formed the groove part 151 dug into the terminal block 150 from an upper surface in the Z1 direction, and the groove part 151 includes groove portions 151a, 151b, 151c, as illustrated in FIG. 9. In these groove portions 151a, 151b, 151c, there are provided not-illustrated screw holes into which the screws 152 can be fastened. At both ends in the Y direction of the terminal block 155, screw insertion holes 165, 166 penetrating in the Z direction are provided, and it is structured such that when the screws are inserted into the screw insertion holes 165, 166, and fastened, the terminal block 150 can be fixed to the base 160 of the terminal block bracket 155. On the base 160 of the terminal block bracket 155, screw holes (not illustrated) corresponding to the screw insertion holes 165, 166, are formed. The terminal block 150 is formed of a high-strength material which possesses insulation performance such as ceramic or resin, for example.

Next, the method of connecting the lead wire 143 and the cable 147 will be described while referring to FIG. 8 to FIG. 10. First, the lead wire 143 extended from the stator winding of the drum motor 11 is introduced into the terminal block 150. The respective lead wires are introduced into the groove portions in a manner such that the lead wire 142 is introduced into the groove portion 151a of the terminal block 150, the lead wire 141 is introduced into the groove portion 151b of the terminal block 150, and the lead wire 140 is introduced into the groove portion 151c of the terminal block 150, for example. Subsequently, the cable 147 extended from the control unit 4 side is introduced into the terminal block 150. The respective lead wires are introduced into the groove portions in a manner such that the lead wire 146 is introduced into the groove portion 151a of the terminal block 150, the lead wire 144 is introduced into the groove portion 151b of the terminal block 150, and the lead wire 145 is introduced into the groove portion 151c of the terminal block 150, for example. Further, in a state where the respective connecting terminals 148 of the lead wire 143 on the drum motor 11 side and the cable 147 on the control unit 4 side are overlapped, they are fixed at predetermined positions of the terminal block 150 by the screws 152. Subsequently, the terminal block 150 is fixed to the base 160 of the terminal block bracket 155 by the screws 156.

The step of attaching the lead wire 143 and the cable 147 to the terminal block 150, and the step of attaching the terminal block 150 to the terminal block bracket 155, are conducted on the outside of the main body part 13. Note that the above-described method of connecting the lead wire 143 and the cable 147 is one example, and it is also possible that the attachment of the lead wire 143 and the cable 147 is conducted after fixing the terminal block 150 to the terminal block bracket 155, for example.

In the rope hoist 1 described above, the drum motor 11 and the reduction gear mechanism 12 are arranged to have a positional relationship such that they are arranged on the front and the rear, respectively, of the main body part 13 being the end frame. On the main body part 13, there is provided the recess 21 at the position isolated from both of the reduction gear mechanism 12 and the drum motor 11, the recess 21 being dug so as to project toward the inside of the drum motor 11 from the motor cover 20 which covers the opening on the output shaft side of the drum motor 11, and the relay 22 is housed in the recess 21. Further, the lead wire 143 extended from the stator winding of the drum motor 11 and the cable 147 extended from the control unit 147 are connected by the relay 22.

By designing as above, the relay 22 can be housed inside the main body part 13, and thus is not projected from the main body part 13. In other words, the relay 22 does not project from the rope drum mechanism 2, so that it is possible to provide the rope hoist 1 capable of reducing a size thereof and having a neat appearance. Further, consequently, during operation and the like of the rope hoist 1, it is possible to prevent that an object from the outside hits against the relay 22.

The lead wire 143 extended from the stator winding of the drum motor 11 passes through the first hole portion 136 to be introduced into the recess 21, and the cable 147 extended from the control unit 4 is guided by the horizontal hole 138 being the second hole portion to be introduced into the recess 21. Further, in the recess 21, the lead wire 143 and the cable 147 are connected by the relay 22. By designing as above, the lead wire 143 can be avoided from being brought into contact with or getting caught in the rotor or the like which rotates in the drum motor 11, and it is possible to make wiring work from the stator to the relay 22 easy. Further, since the lead wire 143 is not exposed to the outside of the main body part 13, so that a neat appearance can be provided. Further, it is possible to prevent that an object from the outside hits against the lead wire 143.

Further, the lead wire 143 extended from the stator winding of the drum motor 11 and the cable 147 extended from the control unit 4 are connected by the screwing in the state where the positions thereof are regulated by the groove part 151 of the terminal block 150. Further, the terminal block 150 is attached to the main body part 13 via the terminal block bracket 155. By designing as above, it is possible to simplify the connecting structure between the lead wire 143 and the cable 147, and it becomes possible to easily conduct the connecting work.

Further, since the recess 21 formed on the main body part 13 is sealed by the cover member 23 via the packing in the state of housing the relay 22, moisture, oil, dust, and the like do not enter the inside of the recess 21, so that it is possible to prevent not only a short circuit between the lead wires at the connection portion between the lead wires caused by the moisture, the oil, the dust and the like, but also corrosion and the like, and thus high durability can be achieved.

Further, the cable 147 extended from the main body part 13 to the control unit 4 is attached to the cable stay 158 bridged between the main body part 13 and the control unit 4 (the counterweight 67). By designing as above, even in the structure in which a distance between the rope drum mechanism 2 and the control unit 4 is long, there is no chance that the cable 147 is sagged, and it is possible to prevent the lead wire 143 and the connection portion between the cable 147 and the control circuit part 65 from being damaged by being hit by an object from the outside. Further, it is possible to provide the rope hoist 1 having a neat appearance.

<Regarding Other Embodiments (Second Embodiment and Third Embodiment)>

Next, other embodiments (a second embodiment and a third embodiment) of the above-described rope hoist 1 will be described. Note that in the rope hoist 1 in the second embodiment and the rope hoist 1 in the third embodiment, the configuration except for a part to be described below is common to the configuration of the rope hoist 1 in the first embodiment.

Figure 11:
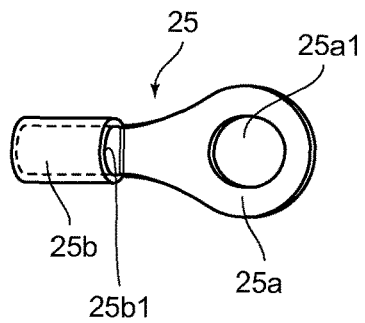
FIG. 11 is a view according to a second embodiment of the present invention, and illustrating a configuration of a crimp terminal used as a connecting member as an alternative to the relay.
Figure 12:
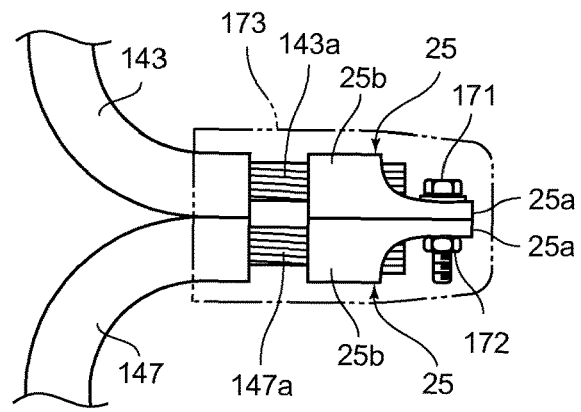
FIG. 12 is a side view illustrating a state where a lead wire and a cable are connected by using the crimp terminals illustrated in FIG. 11.

First, a part of the rope hoist 1 according to the second embodiment, which is different from the first embodiment, will be described. FIG. 11 is a view according to the second embodiment, and illustrating a configuration of a crimp terminal 25 used as a connecting member as an alternative to the relay 22. FIG. 12 is a side view illustrating a state where the lead wire 143 and the cable 147 are connected by using the crimp terminals 25.

To each of an end of the lead wire 143 and an end of the cable 147, the crimp terminal 25 made of metal such as illustrated in FIG. 11 is attached. The crimp terminal 25 has a ring-shaped ring terminal portion 25a, and on the ring terminal portion 25a, a ring hole 25a1 is provided. The ring terminal portion 25a is provided with a cylindrical portion 25b having a cylindrical shape. Further, into a cylindrical hole 25b1 of the cylindrical portion 25b, a conductive portion 143a of the lead wire 143 is inserted. Further, when, after the insertion of the conductive portion 143a, the cylindrical portion 25b is subjected to plastic deformation caused by crimping (crushing and the like), the crimp terminal 25 and the conductive portion 143a of the lead wire 143 are in a crimped state, and are electrically conducted with each other. Further, there is created a state where the crimp terminal 25 is attached to the end of the lead wire 143. Note that the crimp terminal 25 attached to the end of the lead wire 143 corresponds to a first crimp terminal.

Further, in a similar manner to the conductive portion 143a of the lead wire 143, a conductive portion 147a of the cable 147 is inserted into the cylindrical hole 25b1 of the cylindrical portion 25b, and after the insertion, by performing the crimping which causes the plastic deformation such as crushing of the cylindrical portion 25b, the crimp terminal 25 and the conductive portion 147a of the cable 147 are electrically conducted with each other. Further, there is created a state where the crimp terminal 25 is attached to the end of the cable 147. Note that the crimp terminal 25 attached to the end of the cable 147 corresponds to a second crimp terminal.

After performing the crimping described above, the crimp terminal 25 attached to the end of the lead wire 143 and the crimp terminal 25 attached to the end of the cable 147 are connected. In this connection, the ring terminal portions 25a of both of the crimp terminals 25 are overlapped, and in that state, a screw 171 is inserted into the ring holes 25a1. After that, a nut 172 is fastened from an opposite side of a head portion (a tip side) of the screw 171. Consequently, the two crimp terminals 25 are electrically connected. Further, after performing the connection described above, the two crimp terminals 25 and the conductive portions 143a, 147a, are covered by an insulation coating 173, to thereby create a state where the conductive portions are not exposed to the outside.

Note that in FIG. 12, the connection portion between the two crimp terminals 25 is at a position deviated from the extending direction of the lead wire 143 and the cable 147. However, the connection portion between the two crimp terminals 25 may also be at a position in a direction same as the extending direction of the lead wire 143 and the cable 147 (a serial connection relation may also be employed).

Note that the above-described crimp terminal 25 is one example, and it is possible to use various types of crimp terminals. For example, it is possible to employ, other than the crimp terminal 25 referred to as R-shaped crimp terminal having the ring hole 25a1, a Y-shaped crimp terminal which is branched in a Y-shape, and another crimp terminal having a unique shape.

In the configuration as described above, by using the crimp terminals 25 instead of the relay 22, it is possible to realize the secure electrical connection between the lead wire 143 and the cable 147 with simple configuration.

Figure 13:
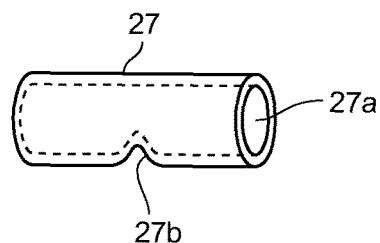
FIG. 13 is a view according to a third embodiment of the present invention, and illustrating a configuration of a crimp sleeve used as a connecting member as an alternative to the relay.
Figure 14:
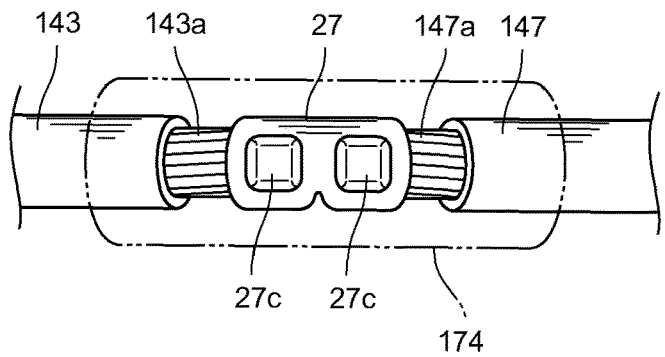
FIG. 14 is a side view illustrating a state where the lead wire and the cable are connected by using the crimp sleeve illustrated in FIG. 13.

Subsequently, a part of the rope hoist 1 according to the third embodiment, which is different from the first embodiment, will be described. FIG. 13 is a view according to the third embodiment, and illustrating a configuration of a crimp sleeve 27 used as a connecting member as an alternative to the relay 22. FIG. 14 is a side view illustrating a state where the lead wire 143 and the cable 147 are connected by using the crimp sleeve 27.

As illustrated in FIG. 13, the crimp sleeve 27 is a cylindrical member made of metal. This crimp sleeve 27 has a cylindrical hole 27a into which the conductive portion 143a of the lead wire 143 or the conductive portion 147a of the cable 147 can be inserted. Further, the crimp sleeve 27 illustrated in FIG. 13 is of a type called as butt type, and has a recessed fitting portion 27b provided at its center portion in a longitudinal direction. Further, since the recessed fitting portion 27b exists, a not-illustrated projecting portion is provided inside the cylindrical hole 27a, and when the conductive portion 143a or the conductive portion 147a is inserted, it comes in contact with the projecting portion. Consequently, it becomes possible to prevent the conductive portion 143a or the conductive portion 147a from being excessively deeply inserted.

The conductive portion 143a is inserted from one end side (a side of a left end portion in FIG. 14) of such a cylindrical hole 27a, and the conductive portion 147a is inserted from the other end side (a side of a right end portion in FIG. 14) of the cylindrical hole 27a. After the insertion, by causing, from an outer peripheral side of the crimp sleeve 27, the plastic deformation by performing crimping (crushing and the like) (FIG. 14 illustrates crimping portions 27c), the conductive portion 143a of the lead wire 143 and the conductive portion 147a of the cable 147 are in a crimped state with respect to the crimp sleeve 27, and they are electrically conducted with each other.

Note that the above-described crimp sleeve 27 is one example, and various types of crimp sleeves can be used. For example, a crimp sleeve having a ring shape in which the recessed fitting portion 27b does not exist may also be used, and other than that, it is also possible to use a crimp sleeve having a unique shape.

When the above-described configuration is employed, even in a case where the crimp sleeve 27 is used instead of the relay 22, it becomes possible to realize the secure electrical connection between the lead wire 143 and the cable 147 with simple configuration.

Note that the present invention is not limited to the above-described respective embodiments, and the present invention includes modification, improvement, and the like within a range capable of achieving the object of the present invention. For example, in the rope hoist 1 in the above-described embodiment, the lead wire 143 and the cable 147 are connected by being directly overlapped with each other on the terminal block 150, but, it is also possible to structure such that the lead wire 143 and the cable 147 are connected with connection clamps provided therebetween. When the above-described embodiment is applied, three connection clamps are used, in each of which any lead wire in the lead wire 143 is fixed to one end portion, and any lead wire in the cable 147 corresponding to the lead wire 143 is fixed to the other end portion. Note that also in this case, it is preferable to define positions of the connection clamps by the terminal block.

Further, in the above-described embodiment, the terminal block 150 is fixed to the main body part 13 via the terminal block bracket 155, but, it is also possible to structure such that the terminal block 150 is directly fixed to the main body part 13.

Further, in the above-described embodiment, the relay 22 is arranged on the front surface side of the main body part 13, but, regarding the arrangement position of the relay 22, it is also possible to arrange the relay 22 on the side surface of the main body part 13, as long as the relay 22 can be housed inside the main body part 13, and the lead wire 143 can be extended to the position isolated from the reduction gear train.

Further, the rope hoist 1 in the above-described embodiment is one of so-called 4/1 reeving type in which one end of the wire rope W is fixed to the rope drum 10, the other end of the wire rope W is fixed to the rope pressing metal fitting 81, and the intermediate sheave 31 is arranged between the rope drum 10 and the rope pressing metal fitting 81. However, the present invention is not applied only to the 4/1 reeving type. For example, the present invention can also be applied to a so-called 2/1 reeving type in which one end of the wire rope W is fixed to the rope drum 10 and the other end of the wire rope W is fixed to the rope pressing metal fitting 81, but, the intermediate sheave is not used. Further, the present invention can also be applied to a so-called 4/2 reeving type in which one end of the wire rope W is fixed to one rope drum 10, the other end of the wire rope W is fixed to another rope drum (a direction of spiral grooves of this rope drum is reverse to that of the rope drum 10), and an intermediate sheave is arranged between the rope drums. Further, the present invention can also be applied to rope hoists of the other types.

Further, although the above-described embodiments are described by citing the rope hoist 1 as an example, the present invention can also be applied to another apparatus which performs hoisting of a rope such as a wire rope. For example, the present invention can be applied to an electric hoisting machine, an electric chain block, and the like.

Further, although the rope hoist 1 in each of the above-described embodiments uses the wire rope W as a rope, the rope may also be made of resin or cloth. Further, the recess 21 is arranged on the outside of the wall portion 125, and the surface of the cover member 23 and the surface of the motor cover 20 have the same height, namely, they are on the same plane, but, it is also possible to design such that the surface of the cover member 23 projects from the motor cover 20.

The invention claimed is:

1. A rope hoist for moving a cargo in an up and down direction and moving the suspended cargo along a rail installed on a ceiling side, the rope hoist comprising:
a rope drum around which a wire rope can be wound;
a drum motor for rotating the rope drum;
a reduction gear mechanism reducing the rotation of the drum motor and transmitting the rotation to the rope drum; and
a control unit controlling driving of the drum motor, and the rope drum and the drum motor are attached in a parallel manner to a first side of an end frame member, the reduction gear mechanism is arranged on a second side of the end frame member, and the end frame member has a motor cover covering an end surface on the reduction gear mechanism side of the drum motor;
the control unit having a control circuit part which performs inverter control on the drum motor and a braking resistor part which gives braking resistance in the inverter control,
the motor cover is provided with a recess which is dug so as to project from a surface of the motor cover toward the inside of the drum motor, at a position isolated from the reduction gear mechanism; and
a connecting member connecting a lead wire extended from a stator winding of the drum motor and a cable extended from the control unit is housed in the recess.

2. The rope hoist according to claim 1, wherein
the end frame member includes a first hole portion through which the lead wire extended from the stator winding of the drum motor is inserted into the recess, and a second hole portion through which lead wires extended from the control unit are inserted into the recess.

3. The rope hoist according to claim 2, wherein:
the connecting member is a relay including a terminal block and a terminal block bracket;
the terminal block is a part for connecting the lead wire extended from the stator winding of the drum motor and the cable extended from the control unit; and the terminal block bracket is a part for fixing the terminal block to the end frame member in the recess.

4. The rope hoist according to claim 2, wherein:
the connecting member includes a first crimp terminal attached to an end of the lead wire, and a second crimp terminal attached to an end of the cable; and
the connecting member further includes a fastening member fastening the first crimp terminal and the second crimp terminal in a state where the first crimp terminal and the second crimp terminal are overlapped and both of the terminals can be electrically conducted with each other.

5. The rope hoist according to claim 2, wherein
the recess is sealed by a cover member via packing in a state of housing the connecting member.

6. The rope hoist according to claim 2, wherein
the cable extended from the control unit is attached to a cable stay bridged between the end frame member and a counterweight to which the control unit is attached.

7. The rope hoist according to claim 1, wherein:
the connecting member includes a terminal block bracket and a terminal block (150) having a screw and a groove part;
the terminal block is a part for connecting the lead wire extended from the stator winding of the drum motor and the cable extended from the control unit by combining and fixing the lead wire and the cable in the groove part by the screw; and
the terminal block bracket is a part for fixing the terminal block to the end frame member in the recess.

8. The rope hoist according to claim 7, wherein
the recess is sealed by a cover member via packing in a state of housing the connecting member.

9. The rope hoist according to claim 7, wherein
the cable extended from the control unit is attached to a cable stay bridged between the end frame member and a counterweight to which the control unit is attached.

10. The rope hoist according to claim 1, wherein:
the connecting member includes a first crimp terminal attached to an end of the lead wire, and a second crimp terminal attached to an end of the cable; and
the connecting member further includes a fastening member fastening the first crimp terminal and the second crimp terminal in a state where the first crimp terminal and the second crimp terminal are overlapped and both of the terminals can be electrically conducted with each other.

11. The rope hoist according to claim 10, wherein
the recess is sealed by a cover member via packing in a state of housing the connecting member.

12. The rope hoist according to claim 10, wherein
the cable extended from the control unit is attached to a cable stay bridged between the end frame member and a counterweight to which the control unit is attached.

13. The rope hoist according to claim 1, wherein
the connecting member is a sleeve into which an end of the lead wire and an end of the cable are inserted, and electrically connecting the lead wire and the cable.

14. The rope hoist according to claim 13, wherein
the recess is sealed by a cover member via packing in a state of housing the connecting member.

15. The rope hoist according to claim 13, wherein
the cable extended from the control unit is attached to a cable stay bridged between the end frame member and a counterweight to which the control unit is attached.

16. The rope hoist according to claim 1, wherein
the recess is sealed by a cover member via packing in a state of housing the connecting member.

17. The rope hoist according to claim 16, wherein
the cable extended from the control unit is attached to a cable stay bridged between the end frame member and a counterweight to which the control unit is attached.

18. The rope hoist according to claim 1, wherein
the cable extended from the control unit is attached to a cable stay bridged between the end frame member and a counterweight to which the control unit is attached.

* * * * *